US008607676B2

(12) United States Patent
Ivan

(10) Patent No.: US 8,607,676 B2
(45) Date of Patent: Dec. 17, 2013

(54) DOUBLE HELIX DIE GROOVING TOOL FOR PIPE

(75) Inventor: Frank Ivan, Echo Bay (CA)

(73) Assignee: Algo Machine Shop Ltd., Ontario (CA)

( * ) Notice: Subject to any disclaimer, the term of this patent is extended or adjusted under 35 U.S.C. 154(b) by 510 days.

(21) Appl. No.: 12/914,513

(22) Filed: Oct. 28, 2010

(65) Prior Publication Data
US 2011/0107895 A1     May 12, 2011

(30) Foreign Application Priority Data

Nov. 10, 2009 (CA) .................................. 2685722

(51) Int. Cl.
    *B26D 3/06*     (2006.01)
    *B23D 21/14*     (2006.01)

(52) U.S. Cl.
    USPC ................. 82/1.2; 82/1.3; 82/1.4; 29/90.01

(58) Field of Classification Search
    USPC ......... 82/1.2, 1.3, 1.4, 113; 72/122; 29/90.01; 451/259; 409/74, 143; 83/876, 185; 408/22
    See application file for complete search history.

(56) References Cited

U.S. PATENT DOCUMENTS

| | | | | |
|---|---|---|---|---|
| 2,330,863 A * | 10/1943 | Bonnafe | ...................... | 409/244 |
| 2,377,615 A * | 6/1945 | Crane | ........................... | 264/269 |
| 2,641,822 A * | 6/1953 | Sampson | ........................... | 42/78 |
| 2,690,217 A * | 9/1954 | Robishaw | ..................... | 166/55.8 |
| 3,343,390 A * | 9/1967 | Harris | .............................. | 72/122 |
| 3,510,990 A * | 5/1970 | Steindler | ........................ | 451/541 |
| 3,541,628 A * | 11/1970 | Girard | .............................. | 15/179 |
| 4,569,619 A * | 2/1986 | Newton | ........................... | 407/15 |
| 4,574,442 A * | 3/1986 | Dickinson et al. | ............ | 29/90.01 |
| 6,560,835 B2 * | 5/2003 | Porter et al. | .................. | 29/90.01 |
| 7,089,837 B2 * | 8/2006 | Feil et al. | .......................... | 82/1.4 |
| 7,328,637 B2 * | 2/2008 | Takashima et al. | ............. | 82/1.11 |
| 7,347,652 B2 * | 3/2008 | Giovanelli et al. | ............ | 409/132 |
| 7,909,548 B2 * | 3/2011 | Wirtanen et al. | ............... | 409/132 |

FOREIGN PATENT DOCUMENTS

| | | | | |
|---|---|---|---|---|
| CA | 282697 A | 8/1928 | | |
| CA | 371230 A | 1/1938 | | |
| CA | 507854 A | 11/1954 | | |
| CA | 991411 A1 | 6/1976 | | |
| CA | 1140398 A1 | 2/1983 | | |
| CA | 2036674 C | 11/1991 | | |
| JP | 56109133 A * | 8/1981 | ............. | B21K 21/00 |

* cited by examiner

*Primary Examiner* — Will Fridie, Jr.
(74) *Attorney, Agent, or Firm* — Akerman LLP; Peter A. Chiabotti

(57) ABSTRACT

A die grooving tool for insertion into a pipe having a first die body and a second die body mounted upon a first end of the first die body. Each of the first die body and a second die body have a plurality of openings thereon for receiving a plurality of cutting wheels mounted therein. The first die body is configured to rotate at least partially in a clockwise direction and the second die body is configured to rotate at least partially in a counter clockwise direction, so that the cutting wheels of the first die body and the second die body create a double helix groove on an interior of the pipe, whereby the double helix groove intersects at an intersection point every 360 degrees along an entire length of the pipe.

8 Claims, 3 Drawing Sheets

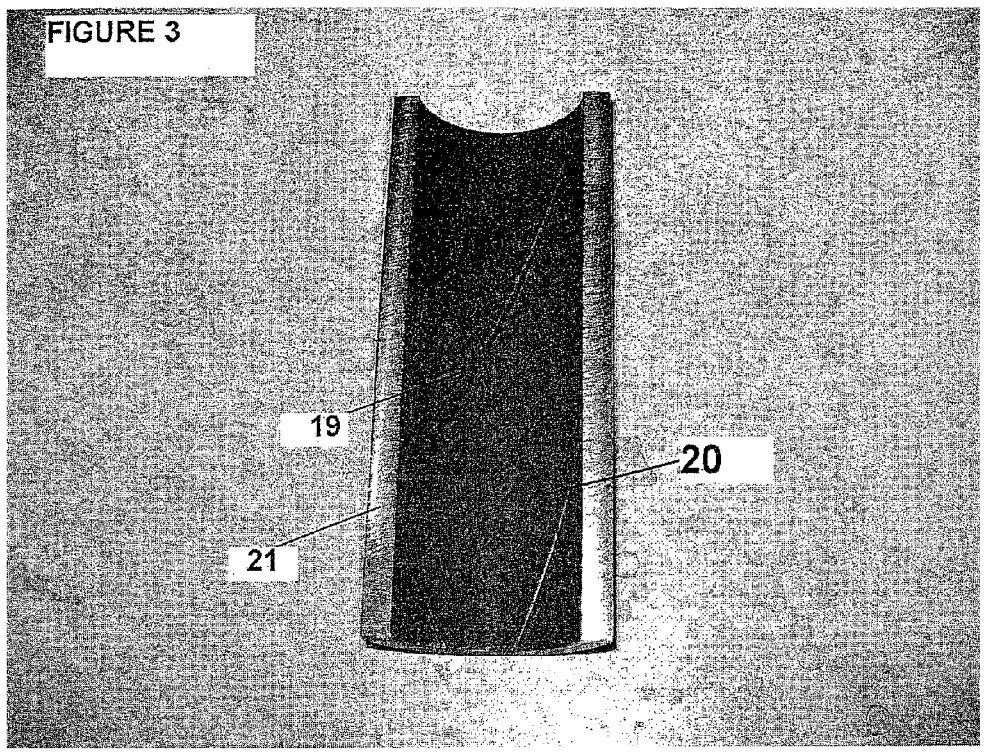

DOUBLE HELIX DIE GROOVING TOOL FOR PIPE

CROSS REFERENCE TO RELATED APPLICATIONS

This application claims priority to Canadian Patent Application No. 2,685,722 filed Nov. 10, 2009, which is hereby incorporated by reference in its entirety.

FIELD OF THE INVENTION

The present invention relates generally to a die grooving tool for pipe and, more particularly, to a portable die grooving tool for pipe that provides a double helix groove on the interior diameter of a pipe.

DESCRIPTION OF THE PRIOR ART

The use of pin and bushing applications is well known, it being understood that a bushing is a type of bearing designed to reduce friction and wear inside a hole, or to constrict and restrain motion of mechanical parts. It is preferred, when such pin and bushing applications are utilized, that adequate lubrication be provided to the pin and bushing application to ensure smooth movement and to minimize contact between bearing surfaces. As a means of ensuring such lubrication within a pipe, it is preferable that grooves are cut into the interior of a pipe so as to allow for the transfer of lubricant therein. However, conventional devices that perform this function can be large, not readily portable, and are time consuming to operate. Further, grooves cut by such conventional devices do not adequately help to lubricate the pin and bushing under any radial or dynamic loads. In addition, some conventional die grooving tools cannot cut grooves into long length of pipe, and as such are limited in their operational capacity.

Accordingly, there remains the need for a portable die grooving tool for pipe that can quickly provide a double helix groove on the interior diameter of a pipe, whereby the pin and bushing can be adequately lubricated under radial or dynamic loads. To this end, the present invention effectively addresses this need.

SUMMARY OF THE INVENTION

A general object and advantage of the present invention is to provide an improved die grooving tool for pipe that can provide a double helix groove on the interior diameter of a pipe, whereby the pin and bushing can be adequately lubricated under radial or dynamic loads.

A further object and advantage of the present invention is to provide an improved die grooving tool for pipe which is portable, and which can quickly cut grooves on the interior of a pipe.

A still further object and advantage of the present invention is to provide an improved die grooving tool for pipe which can cut grooves on the interior of long lengths of pipe.

According to one aspect of the present invention, there is provided a die grooving tool comprising a first die body having a plurality of openings thereon, the first die body being constructed and arranged for rotation; a second die body mounted upon a first end of the first die body, and having a plurality of openings thereon, the second die body being constructed and arranged for rotation counter to a direction of rotation of the first die body; a plurality of cutting wheels mounted within plurality of openings on the first die body and the second die body; and a finishing die mounted upon a second end of the first die body.

According to another aspect of the present invention, there is provided a die grooving tool for insertion into a pipe, comprising a first die body having a plurality of openings thereon, the clockwise die body being constructed and arranged for rotation; a second die body mounted upon a first end of the first die body, and having a plurality of openings thereon, the counter clockwise die body being constructed and arranged for rotation counter to a direction of rotation of the first die body; a plurality of cutting wheels mounted within plurality of openings on the first die body and the second die body, wherein the cutting wheels of the first die body and the second die body are constructed and arranged to create a double helix groove on an interior of a pipe, whereby the double helix groove intersects at an intersection point every 360 degrees along an entire length of the pipe; and a finishing die mounted upon a second end of the first die body.

According to another aspect of the present invention, there is provided a method for forming a double helix groove on an interior of a pipe comprising the steps of positioning a die grooving tool within the pipe, the die grooving tool having a first die body and a second die body mounted thereon, each having a plurality of openings for arranged for receiving a plurality of cutting wheels therein; rotating the first die body in a first direction; rotating the second die body in a direction counter to the first direction, wherein the cutting wheels of the first die body and the second die body create the double helix groove on the interior of a pipe, whereby the double helix groove intersects at an intersection point every 360 degrees along an entire length of the pipe; and rotating a finishing die mounted upon the first die body to finish the interior of the pipe.

BRIEF DESCRIPTION OF THE DRAWINGS

A preferred embodiment of the present invention is described below with reference to the accompanying drawings, in which:

FIG. 3 illustrates a cross section of a pipe having the double helix groove cut therein by the die grooving tool of the present invention.

DESCRIPTION OF THE PREFERRED EMBODIMENT

Figure 1:
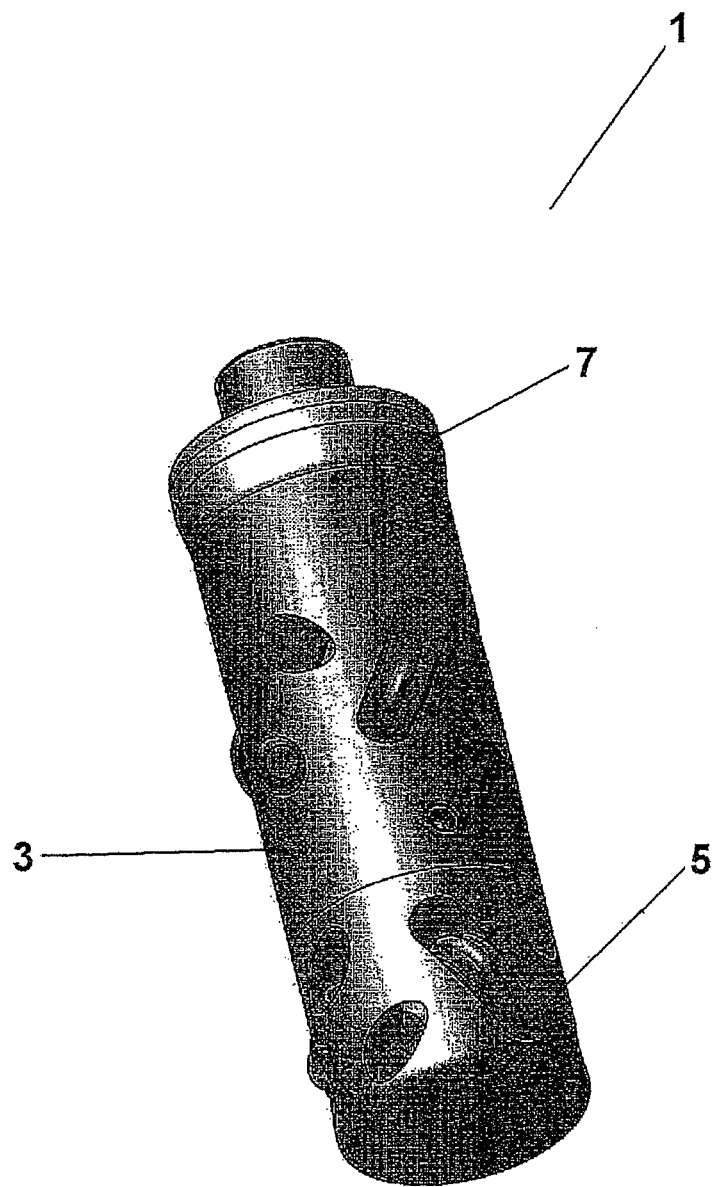
FIG. 1 illustrates a perspective view of the die grooving tool of the present invention.
Figure 2:
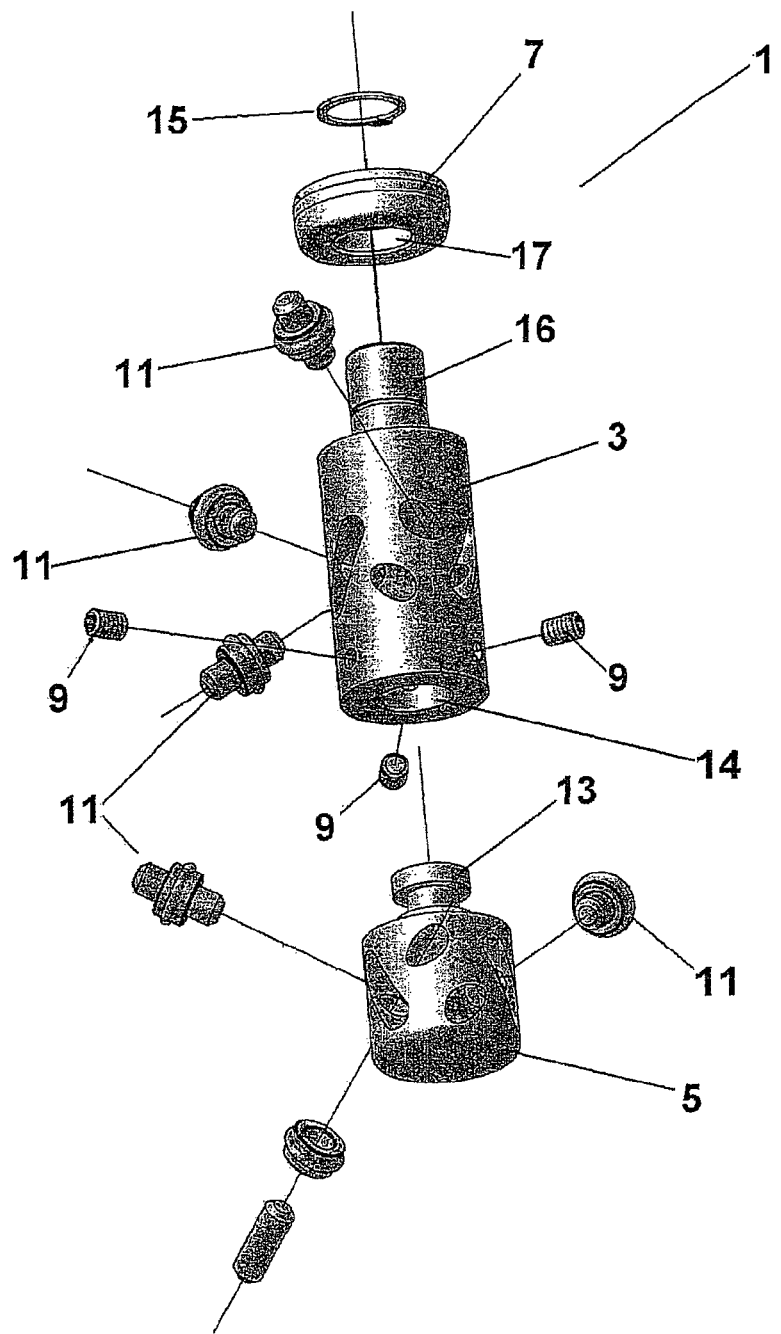
FIG. 2 illustrates an exploded view of the die grooving tool of the present invention.

With reference now to the drawings, and in particular to FIGS. 1 and 2, the die grooving tool of the present invention, generally designated by reference numeral 1, will now be described. In a preferred embodiment, the die grooving tool generally comprises a clockwise die body 3 and a counter clockwise die body 5 that is mounted thereon. In effecting such mounting, an end 13 of the counter clockwise die body 5 is secured into an opening 14 on the clockwise die body 3. Once inserted, the counter clockwise die body 5 is fastened and secured to the clockwise die body 3 by way of screws 9 inserted through openings on the outside surface of the clockwise die body 3, as can be seen with reference to FIG. 2. Of course, it will be readily understood that variations as to the number and placement of such openings on the clockwise die body 3 (or on the counter clockwise die body 5) for receiving the screws 9 could be effected, as would be readily understood by one skilled in the art.

The clockwise die body 3 and the counter clockwise die body 5 each have a plurality of cutting wheels 11 mounted thereon, the cutting wheels 11 being inserted through openings on the outside surface of the clockwise die body 3 and the counter clockwise die body 5. In a preferred embodiment, the clockwise die body 3 and the counter clockwise die body 5 each have three cutting wheels 11, though it will be readily understood that variations to this number may be effected.

A finishing die 7 is mounted upon an end 16 of the clockwise die body 3, the finishing die 7 having an opening 17 to effect such mounting upon the end 16 of the clockwise die body 3. To assist in securing the finishing die 7 to the end 16 of the clockwise die body 3, an annular securing ring 15 is also mounted upon the end 16 of the clockwise die body 3, and is received through the opening 17 of the finishing die 7.

In operation, to effect the cutting of grooves on the interior diameter of a pipe, the die grooving tool 1 is first inserted into a pipe (not shown). The die cutting tool 1 can be utilized on pipe manufactured from many types of materials, including, but not limited to, all mid steel 1010 to 1026 SAE, aluminum, brass, 660 bronze, aluminum bronze, copper, carbon steel fully annealed, stainless steel and materials having a material hardness less than 30 Rockwell (c). It will also be understood that pipe grooved by the die grooving tool 1 of the present invention can be used in a variety of ways, including, but not limited to, automotive applications, mining and logging aviation and marine, tractor/trailer brake cams and all aspects of mechanical motion function. In a preferred embodiment, the die grooving tool 1 of the present invention can accommodate any size of pipe ranging from 0.500" up to 12.0" or larger, and can groove a length of pipe to 240.0", or longer.

Once the die grooving tool 1 is inserted into a pipe (not shown), the cutting wheels 11 on the clockwise die body 3 and the counter clockwise die body 5 make contact with the interior diameter of the pipe and, as the die grooving tool 1 is pushed through the interior of the pipe by means of a press (not shown), the cutting wheels 11 cut the double helix groove on the interior of the pipe. As the die grooving tool 1 extends further into the pipe, the clockwise die body 3 rotates at least partially in a clockwise direction and the counter clockwise die body 5 rotates at least partially in a counter clockwise direction while effecting the double helix groove. The finishing die 7 is also rotatable, and finalizes the finished size of the pipe as the die grooving tool 1 is drawn through the pipe interior. Since the act of cutting the grooves may leave residual material within the pipe, the finishing die 7 acts to remove this material and leave the interior of the pipe with a smooth surface.

Preferably, the cutting wheels 11 on the clockwise die body 3 and the counter clockwise die body 5 create an embossing impression or a high energy displacement groove at 30 degrees in the counter clockwise and clockwise direction to a depth of 0.032"×0.080" of width groove per each of the cutting wheels 11, it being readily understood that variations to this may be effected, depending upon the end user requirements. The double helix groove intersection point on the interior of the pipe, once cut, intersects and meets every 360 degrees along the entire length of the pipe, which provides improved distribution of lubrication in both longitudinal directions. This intersection point 19 can be seen with reference to FIG. 3, which illustrates a cross section of a pipe 21 having the double helix groove 20 cut therein by the die grooving tool 1 of the present invention.

The present invention has been described herein with regard to preferred embodiments. However, it will be obvious to persons skilled in the art that a number of variations and modifications can be made without departing from the scope of the invention as described herein.

What is claimed:

1. A die grooving tool comprising:
   a first die body having a plurality of openings thereon, the first die body being constructed and arranged for rotation;
   a second die body mounted upon a first end of the first die body, and having a plurality of openings thereon, the second die body being constructed and arranged for rotation counter to a direction of rotation of the first die body;
   a plurality of cutting wheels mounted within a plurality of openings on the first die body and the second die body; and
   a finishing die mounted upon a second end of the first die body.

2. The die grooving tool of claim 1, wherein the second die body is secured to the first die body with screws.

3. The die grooving tool of claim 1, wherein the first die body rotates at least partially in a clockwise direction and the second die body rotates at least partially in a counter clockwise direction.

4. The die grooving tool of claim 1, wherein the finishing die is rotatable.

5. The die grooving tool of claim 1, wherein the first die body and the second die body each have at least three cutting wheels.

6. The die grooving tool of claim 1, wherein the cutting wheels of the first die body and the second die body are constructed and arranged to create a double helix groove on an interior of a pipe.

7. The die grooving tool of claim 6, wherein the double helix groove cut by the cutting wheels of the first die body and the second die body intersects at an intersection point every 360 degrees along an entire length of the pipe.

8. The die grooving tool of claim 6, wherein the double helix groove is at 30 degrees in each of the clockwise and counter clockwise directions on the interior of a pipe.

* * * * *